(12) United States Patent
Brunn et al.

(10) Patent No.: US 11,630,945 B2
(45) Date of Patent: Apr. 18, 2023

(54) UNDERSTANDING OF THE RELATIONSHIP BETWEEN THE COMMENTS BEING MADE TO THE CONTAINERS AND THE COMMENTS BEING MADE TO THE ELEMENTS OF THE CONTAINERS

(71) Applicant: International Business Machines Corporation, Armonk, NY (US)

(72) Inventors: Jonathan F. Brunn, Logan, UT (US); Jennifer E. Heins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 16/370,196

(22) Filed: Mar. 29, 2019

(65) Prior Publication Data
US 2019/0228061 A1      Jul. 25, 2019

Related U.S. Application Data

(63) Continuation of application No. 14/519,723, filed on Oct. 21, 2014, now Pat. No. 10,353,995.

(51) Int. Cl.
G06F 40/169        (2020.01)
G06F 3/0481        (2022.01)
(Continued)

(52) U.S. Cl.
CPC .......... *G06F 40/169* (2020.01); *G06F 3/0481* (2013.01); *G06F 3/0482* (2013.01);
(Continued)

(58) Field of Classification Search
CPC .......... G06F 17/24; G06F 17/25; G06T 11/60; A63F 2300/5553; A63F 2300/6623
(Continued)

(56) References Cited

U.S. PATENT DOCUMENTS 8,539,336 B2     9/2013 Griffiths et al.
2010/0274674 A1* 10/2010 Roberts ............... H04N 5/445
                                                    705/14.73
(Continued)

FOREIGN PATENT DOCUMENTS

JP          2006092041 A      4/2006

OTHER PUBLICATIONS

List of IBM Patents or Patent Applications Treated as Related, Apr. 1, 2019, pp. 1-2.

*Primary Examiner* — Michael Roswell
*Assistant Examiner* — Jenq-Kang Chu
(74) *Attorney, Agent, or Firm* — Robert A. Voigt, Jr.; Shackelford, Bowen, McKinley & Norton, LLP

(57) ABSTRACT

A method, system and computer program product for improving understanding of comments on collections of data. A social media stream is monitored for comments to a container (e.g., photo album) and elements within the container (e.g., photographs). These comments are stored in a data structure along with an identification of the container or element of the container upon which the comments are directed. In response to a user selecting to view comments to an element within the container or the container itself, the data structure is searched for the comments to the selected element or container. Images of the container are then displayed in a fliptych manner, where the selected element or container is displayed in the center section of the fliptych. A list of comments is displayed in a comments section below the fliptych, where the list of comments includes highlighted comments directed to the selected element or container.

20 Claims, 14 Drawing Sheets

(51) Int. Cl.
    *G06F 16/248*     (2019.01)
    *G06F 16/9535*     (2019.01)
    *G06F 16/2457*     (2019.01)
    *G06Q 50/00*     (2012.01)
    *G06F 16/58*     (2019.01)
    *G06Q 30/02*     (2023.01)
    *G06F 3/0482*     (2013.01)
    *H04L 51/52*     (2022.01)
    *H04L 51/216*     (2022.01)

(52) U.S. Cl.
    CPC ...... *G06F 16/248* (2019.01); *G06F 16/24575* (2019.01); *G06F 16/5866* (2019.01); *G06F 16/9535* (2019.01); *G06Q 30/02* (2013.01); *G06Q 50/01* (2013.01); *H04L 51/216* (2022.05); *H04L 51/52* (2022.05)

(58) Field of Classification Search
    USPC .................................. 715/201, 202, 230, 255
    See application file for complete search history.

(56) References Cited

U.S. PATENT DOCUMENTS

| | | |
|---|---|---|
| 2011/0102327 A1 | 5/2011 | Miki et al. |
| 2011/0238754 A1 | 9/2011 | Dasilva et al. |
| 2012/0046071 A1* | 2/2012 | Brandis ................ G06F 1/1694 |
| | | 455/556.1 |
| 2012/0151347 A1 | 6/2012 | McClements, IV |
| 2012/0317631 A1 | 12/2012 | Assam |
| 2013/0185642 A1 | 7/2013 | Gammons |
| 2013/0238724 A1* | 9/2013 | Cunningham ...... G06F 3/04842 |
| | | 709/206 |
| 2013/0328932 A1 | 12/2013 | Kim et al. |
| 2015/0227925 A1 | 8/2015 | Filler |

\* cited by examiner

UNDERSTANDING OF THE RELATIONSHIP BETWEEN THE COMMENTS BEING MADE TO THE CONTAINERS AND THE COMMENTS BEING MADE TO THE ELEMENTS OF THE CONTAINERS

TECHNICAL FIELD

The present invention relates generally to social network services, and more particularly to improving the understanding of the relationship between the comments being made to the containers (e.g., photo album) and the comments being made to the elements of the containers (e.g., photographs).

BACKGROUND

A social network service is an online service, platform or site that focuses on building and reflecting of social networks or social relations among people (e.g., those who share interests and/or activities). A social network service essentially consists of a representation of each user (often a profile), his/her social links, and a variety of additional services. Most social network services are web-based and provide means for users to interact over the Internet, such as by e-mail and instant messaging. Social networking sites allow users to share ideas, activities, events, and interests within their individual networks.

Social networking sites (e.g., Facebook®) present to a particular user the posts (e.g., comments to a photograph or photo album) and stories by other users in a social networking feed (referred to as a "news feed"). New postings or updates from friends and pages followed by the user (including photo tags, event updates, group memberships and other activity) will be reflected in the news feed. At times, some of the posts or updates include comments directed to containers (e.g., photo album) or the contained elements (e.g., photographs). However, it is not always clear as to whether the comment stream applies to the elements of the container or to the container itself.

For example, a user of a social networking site may receive a notification indicating that an update to a photo album has occurred, such as four new photographs being added to the photo album. A depiction of the photo album along with the photographs in the album may appear to the user so that the user can comment on the album. However, the user may believe that he/she is commenting on one of the photographs of the photo album as opposed to the photo album itself which leads to confusing comment streams. As a result, when the user sees the photograph as part of an album update, the user may see his/her comment in the comment stream; however, when the user sees the comment stream pertaining to the photograph itself, the user will not see his/her comment thereby causing confusion to the user.

Furthermore, when an update is made to an element of a container (e.g., photograph) or to a container (e.g., photo album), users, such as followers of the user who updated the element or container (e.g., posted a new comment about the photograph), may receive a notification of the update. However, such notifications are fragmented in that they occur after every update for a single element of a container or the container and do not provide a view of the social interactions involving an update of several related elements or containers (e.g., photographs, documents).

Hence, the comment streams depicted in social networking sites do not clearly distinguish whether the comments are directed to the elements of the container or to the container itself. Furthermore, the notifications in social networking sites pertaining to updates (e.g., comments) being made to an element of a container or to a container do not provide a view of the social interactions involving an update of several related elements or containers.

SUMMARY

In one embodiment of the present invention, a method for improving understanding of comments on collections of data comprises monitoring a social media stream for comments to a container and elements within the container. The method further comprises issuing a notification on a user interface of a user's computing device regarding comments made to the container and/or one or more elements of the container in response to identifying the comments to the container and/or the one or more elements of the container, where the notification comprises one or more links to the container and/or the one or more elements of the container. The method additionally comprises displaying images of elements of the container in a fliptych manner and a first list of comments in a comments section on the user interface of the user's computing device in response to a user selecting one or more of the one or more links to the container and/or the one or more elements of the container, where an image of the container or an element of the container selected by the user is displayed in a center section of the fliptych, and where the first list of comments comprises comments directed to the container or the element of the container selected by the user which are highlighted.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for improving understanding of comments on collections of data. In one embodiment of the present invention, a social media stream is monitored for comments to a container (e.g., photo album) and elements within the container (e.g., photographs). These comments are stored in a data structure, such as index or table in a database, along with an identification of the container or element of the container upon which the comments are directed. In response to a user selecting to view comments to an element within the container or the container itself, the data structure is searched for the comments to the selected element or container. The comments to the selected element or container are retrieved from the data structure. Images of the container are then displayed in a fliptych manner, where the selected element or container is displayed in the center section of the fliptych. A list of comments is displayed in a comments section below the fliptych, where the list of comments includes highlighted comments directed to the element or container displayed in the center section of the fliptych. In this manner, the user is able to obtain a better understanding of the relationship between the comments being made to the containers (e.g., photo album) and the comments being made to the elements of the containers (e.g., photographs).

While the following discusses the present invention in connection with displaying the elements (e.g., photographs) of a container (e.g., photo album) in a fliptych manner, the principles of the present invention may be applied to any control which allows visual navigation among elements of the container. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
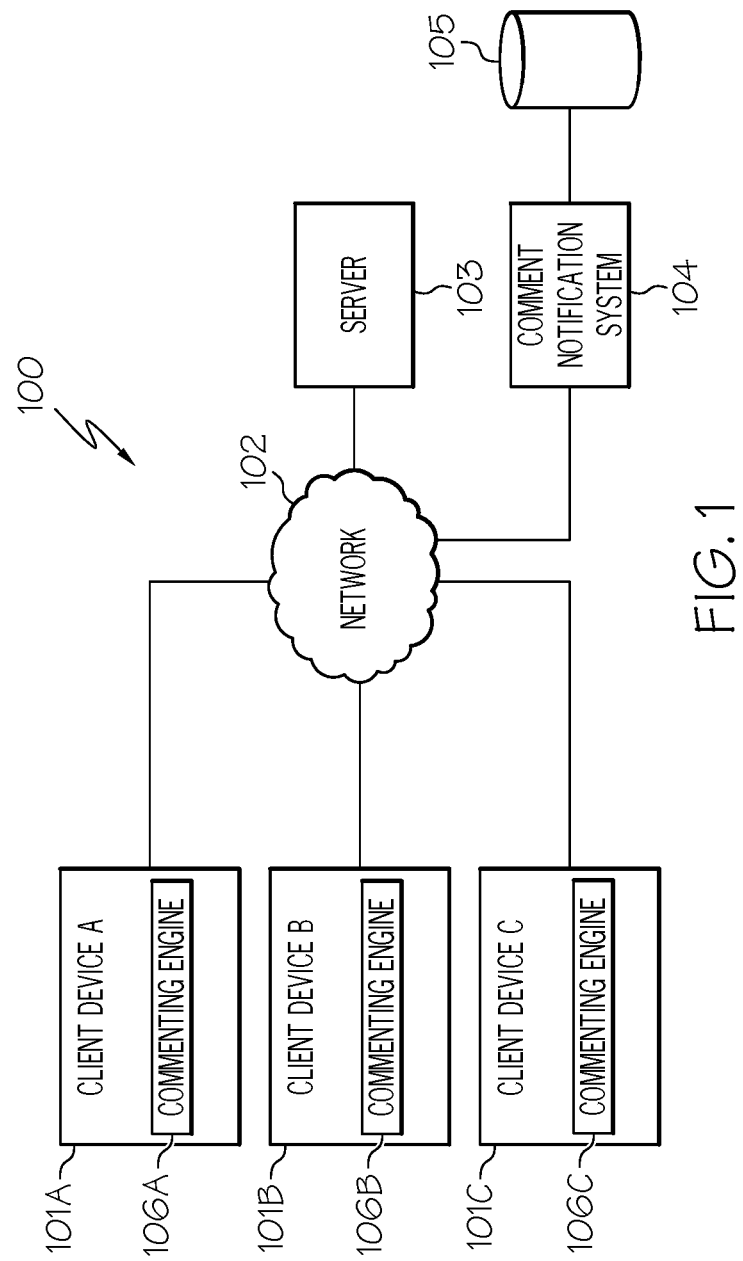
FIG. 1 illustrates a social network system configured in accordance with an embodiment of the present invention.

Referring now to the Figures in detail, FIG. 1 illustrates a social network system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Posts may be added or removed from the social media stream via a commenting engine 106A-106C in client device 101A-101C, respectively. Commenting engines 106A-106C may collectively or individually be referred to as commenting engines 106 or commenting engine 106, respectively. Social network server 103 is connected to network 102 by wire or wirelessly. While FIG. 1 illustrates a single social network server 103, it is noted for clarity that multiple servers may be used to implement the social networking and/or microblogging service.

System 100 further includes a comment notification system 104 connected to network 102 by wire or wirelessly. Comment notification system 104 is configured to improve the understanding of the relationship between the comments being made to the containers (e.g., photo album) and the comments being made to the elements of the containers (e.g., photographs) as discussed in further detail below. A description of the hardware configuration of comment notification system 104 is provided below in connection with FIG. 2.

Furthermore, system 100 includes a database 105 (e.g., relational database) connected to comment notification system 104. Database 105 is configured to store comments and identifications (e.g., markers, such as Uniform Resource Locators (URLs)) of the elements or containers upon which the comments are directed as discussed further below.

System 100 is not to be limited in scope to any one particular network architecture. System 100 may include any number of client devices 101, networks 102, social network servers 103, comment notification systems 104 and databases 105. Furthermore, in one embodiment, comment notification system 104 may be part of client device 101, such as commenting engine 106, or social network server 103.

Figure 2:
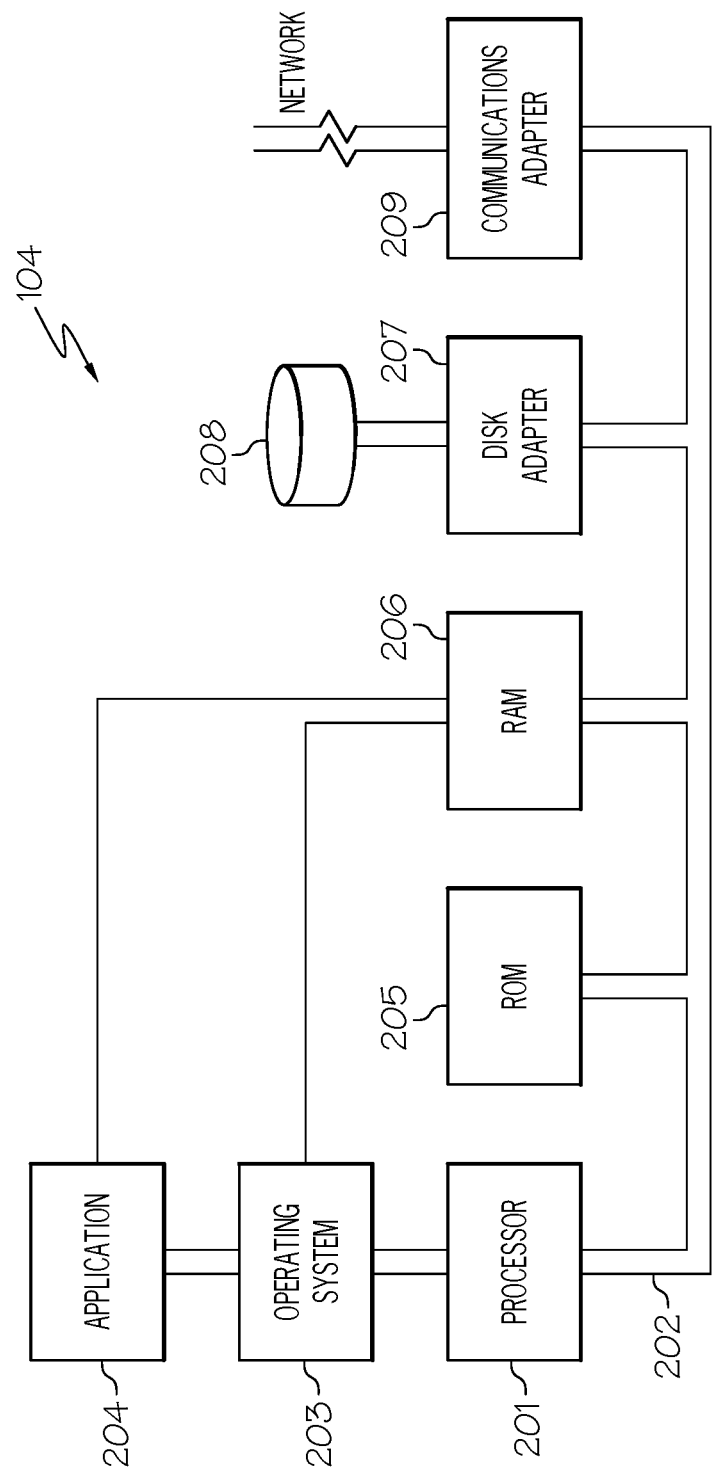
FIG. 2 illustrates a hardware configuration of a comment notification system configured in accordance with an embodiment of the present invention.

Referring now to FIG. 2, FIG. 2 illustrates a hardware configuration of comment notification system 104 (FIG. 1) which is representative of a hardware environment for practicing the present invention. Referring to FIG. 2, comment notification system 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for improving the understanding of the relationship between the comments being made to the containers (e.g., photo album) and the comments being made to the elements of the containers (e.g., photographs) as discussed further below in association with FIGS. 3, 4A-4C and 5-12.

Referring again to FIG. 2, read-only memory ("ROM") 205 is coupled to system bus 202 and includes a basic input/output system ("BIOS") that controls certain basic functions of comment notification system 104. Random access memory ("RAM") 206 and disk adapter 207 are also coupled to system bus 202. It should be noted that software components including operating system 203 and application 204 may be loaded into RAM 206, which may be comment notification system's 104 main memory for execution. Disk adapter 207 may be an integrated drive electronics ("IDE") adapter that communicates with a disk unit 208, e.g., disk drive. It is noted that the program for improving the understanding of the relationship between the comments being made to the containers (e.g., photo album) and the comments being made to the elements of the containers (e.g., photographs), as discussed further below in association with FIGS. 3, 4A-4C and 5-12, may reside in disk unit 208 or in application 204.

Comment notification system 104 may further include a communications adapter 209 coupled to bus 202. Communications adapter 209 interconnects bus 202 with an outside network (e.g., network 102 of FIG. 1) thereby allowing comment notification system 104 to communicate with client devices 101 and social network server 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, it is not always clear as to whether the comment stream in a social networking site applies to the elements of the container (e.g., photographs) or to the container itself (e.g., photo album). For example, a user of a social networking site may receive a notification indicating that an update to a photo album has occurred, such as four new photographs being added to the photo album. A depiction of the photo album along with the photographs in the album may appear to the user so that the user can comment on the album. However, the user may believe that he/she is commenting on one of the photographs of the photo album as opposed to the photo album itself which leads to confusing comment streams. As a result, when the user sees the photograph as part of an album update, the user may see his/her comment in the comment stream; however, when the user sees the comment stream pertaining to the photograph itself, the user will not see his/her comment thereby causing confusion to the user. Furthermore, when an update is made to an element of a container (e.g., photograph) or to a container (e.g., photo album), users, such as followers of the user who updated the element or container (e.g., posted a new comment about the photograph), may receive a notification of the update. However, such notifications are fragmented in that they occur after every update for a single element of a container or the container and do not provide a view of the social interactions involving an update of several related elements or containers (e.g., photographs, documents). Hence, the comment streams depicted in social networking sites do not clearly distinguish whether the comments are directed to the elements of the container or to the container itself. Furthermore, the notifications in social networking sites pertaining to updates (e.g., comments) being made to an element of a container or to a container do not provide a view of the social interactions involving an update of several related elements or containers.

Figure 3:
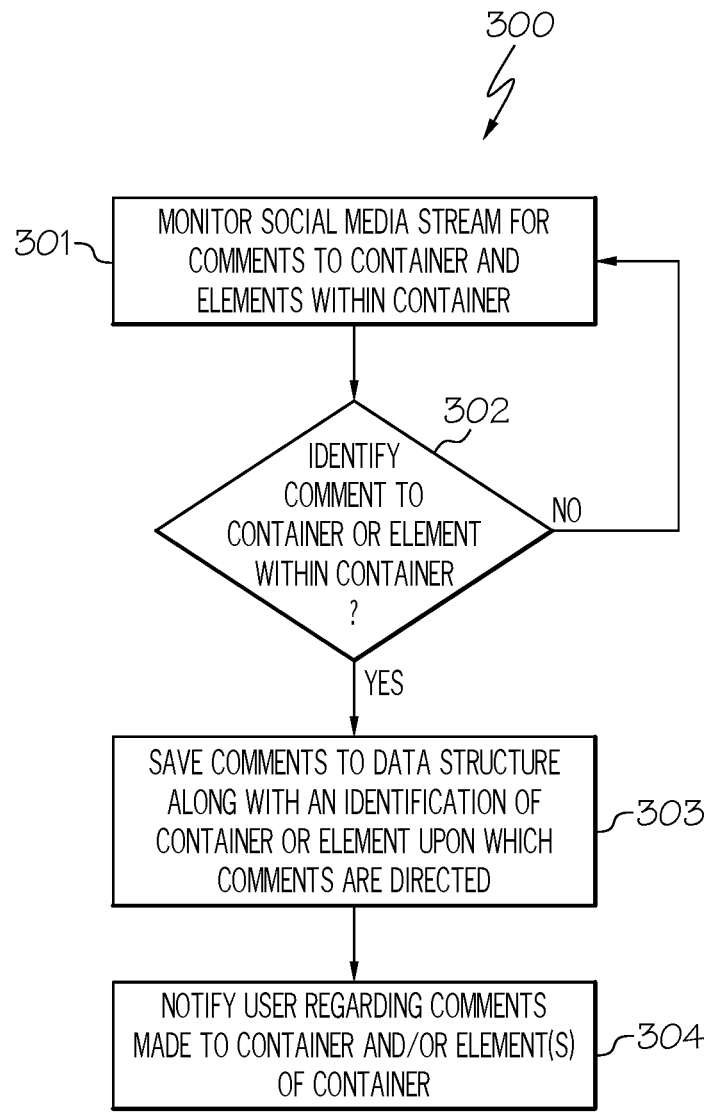
FIG. 3 is a flowchart of a method for monitoring and storing comments to the container and the elements of the container in accordance with an embodiment of the present invention.
Figure 4A:
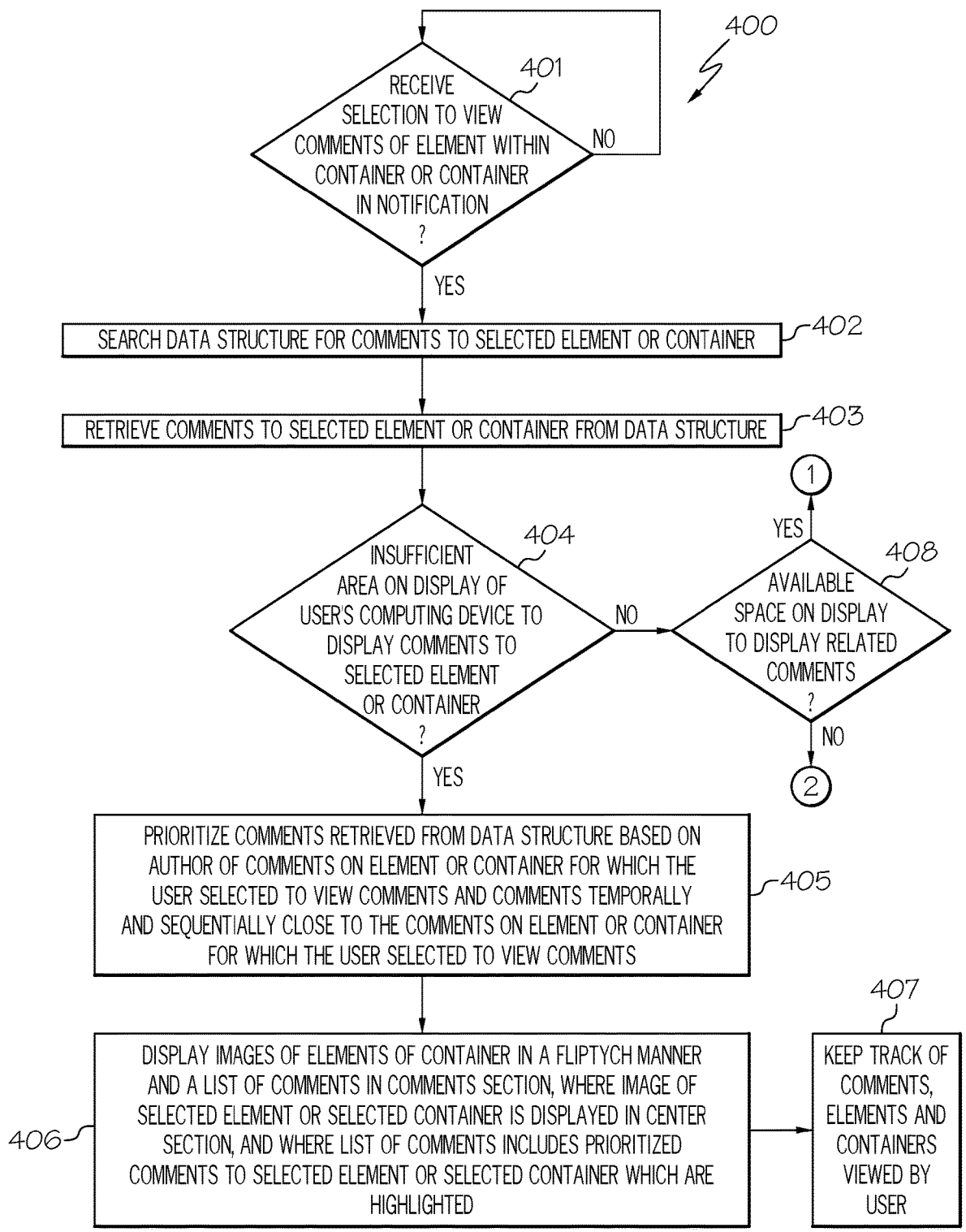
FIGS. 4A-4C are a flowchart of a method for displaying the elements of a container in a fliptych manner along with a comment section containing highlighted comments directed to the element or container depicted in the center section of the fliptych in accordance with an embodiment of the present invention.
Figure 4B:
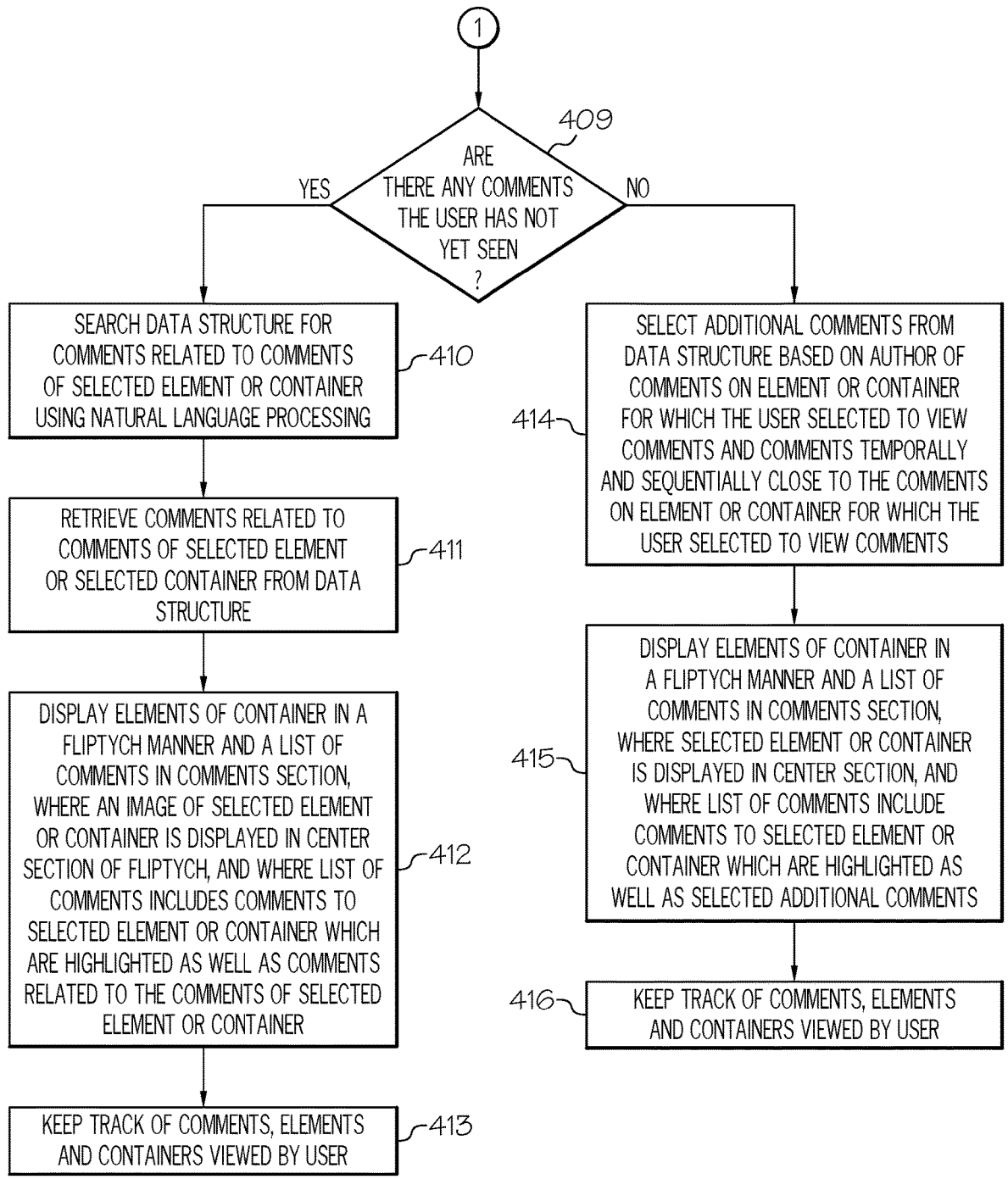
Figure 4C:
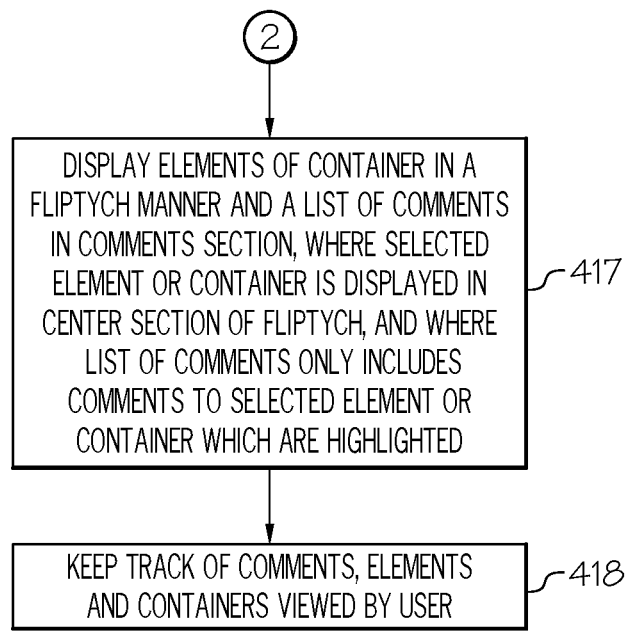
Figure 5:
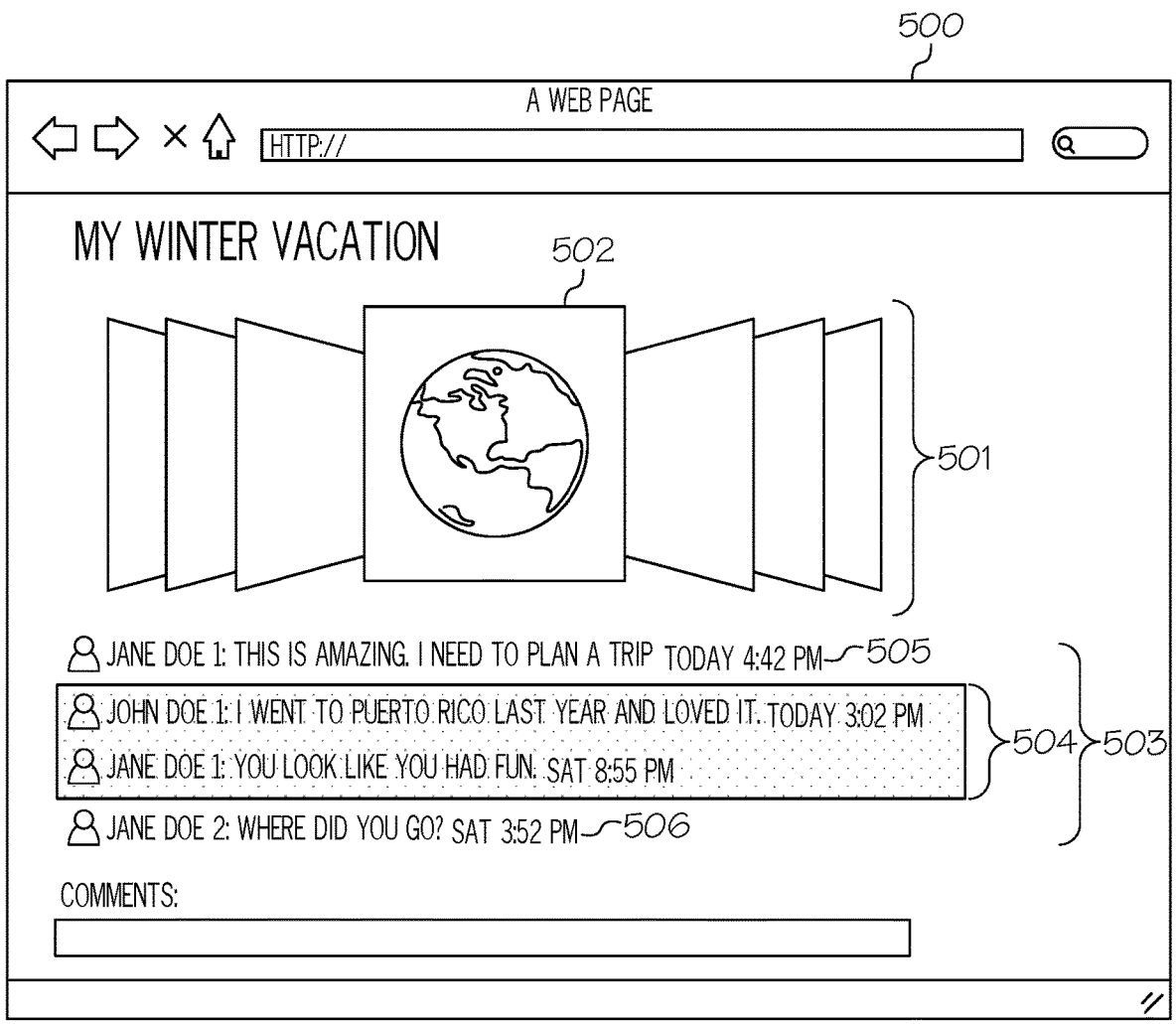
FIG. 5 illustrates a screenshot of a user interface on a client device displaying the elements of a container in a fliptych manner along with a comment section, where the comments in the comment section directed to the element or container depicted in the center section of the fliptych are highlighted in accordance with an embodiment of the present invention.
Figure 6:
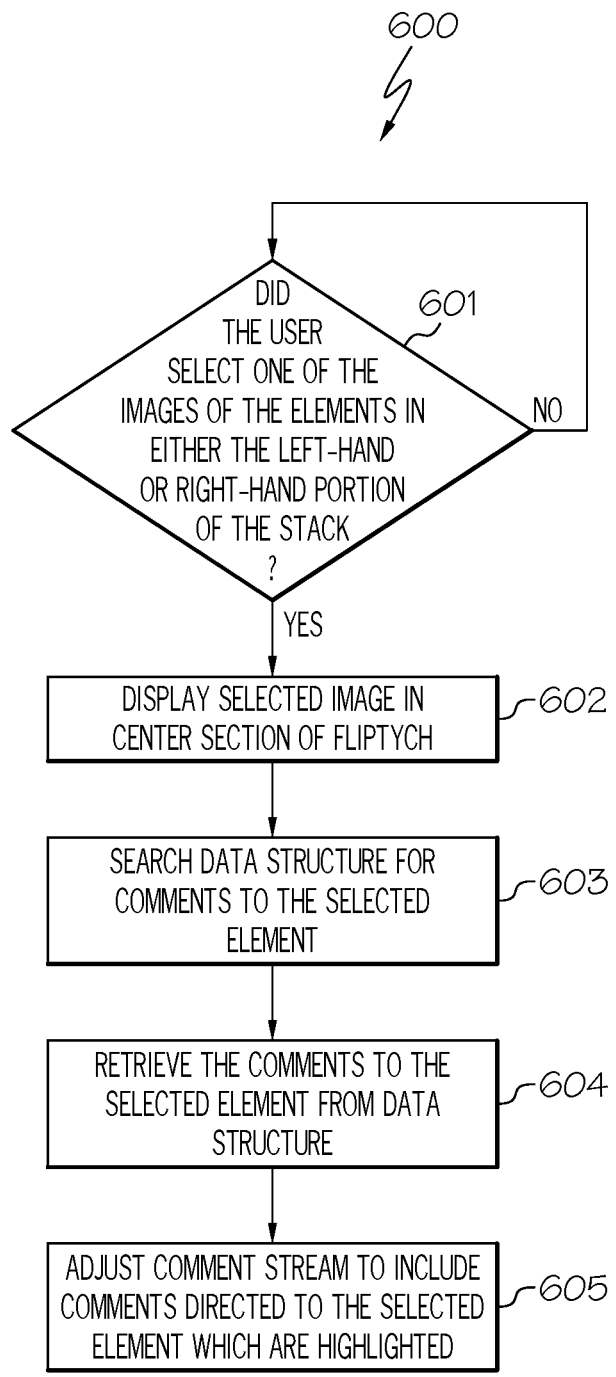
FIG. 6 is a flowchart of a method for adjusting the comment stream in response to the user selecting an image of a different element in the fliptych to become the currently selected element in accordance with an embodiment of the present invention.
Figure 7:
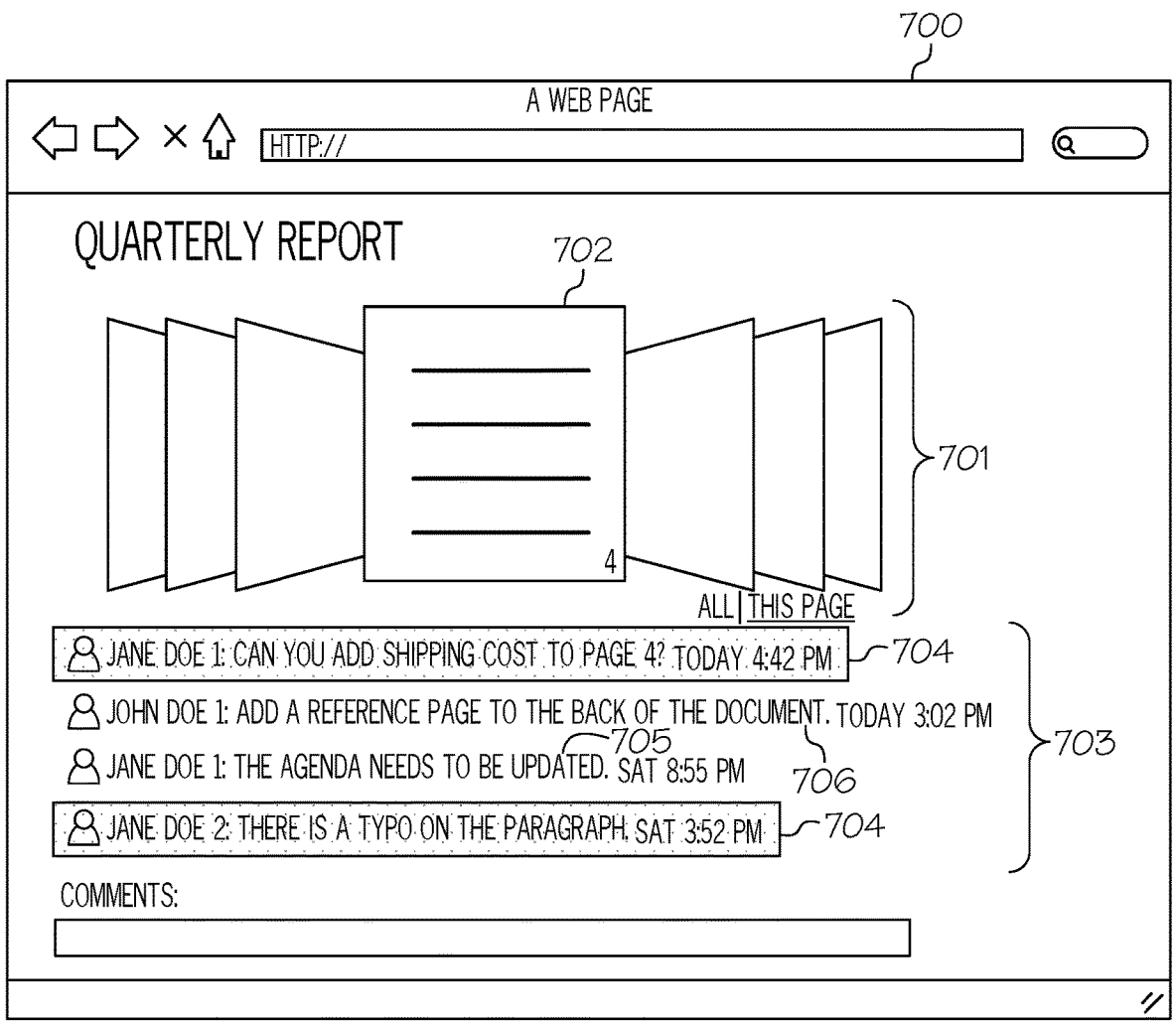
FIG. 7 illustrates a screenshot of a user interface on a client device displaying the elements of a container, such as pages of a document, in a fliptych manner along with a comment section that includes comments to the pages of the document, where the comments directed to the page depicted in the center section of the fliptych are highlighted in accordance with an embodiment of the present invention.
Figure 8:
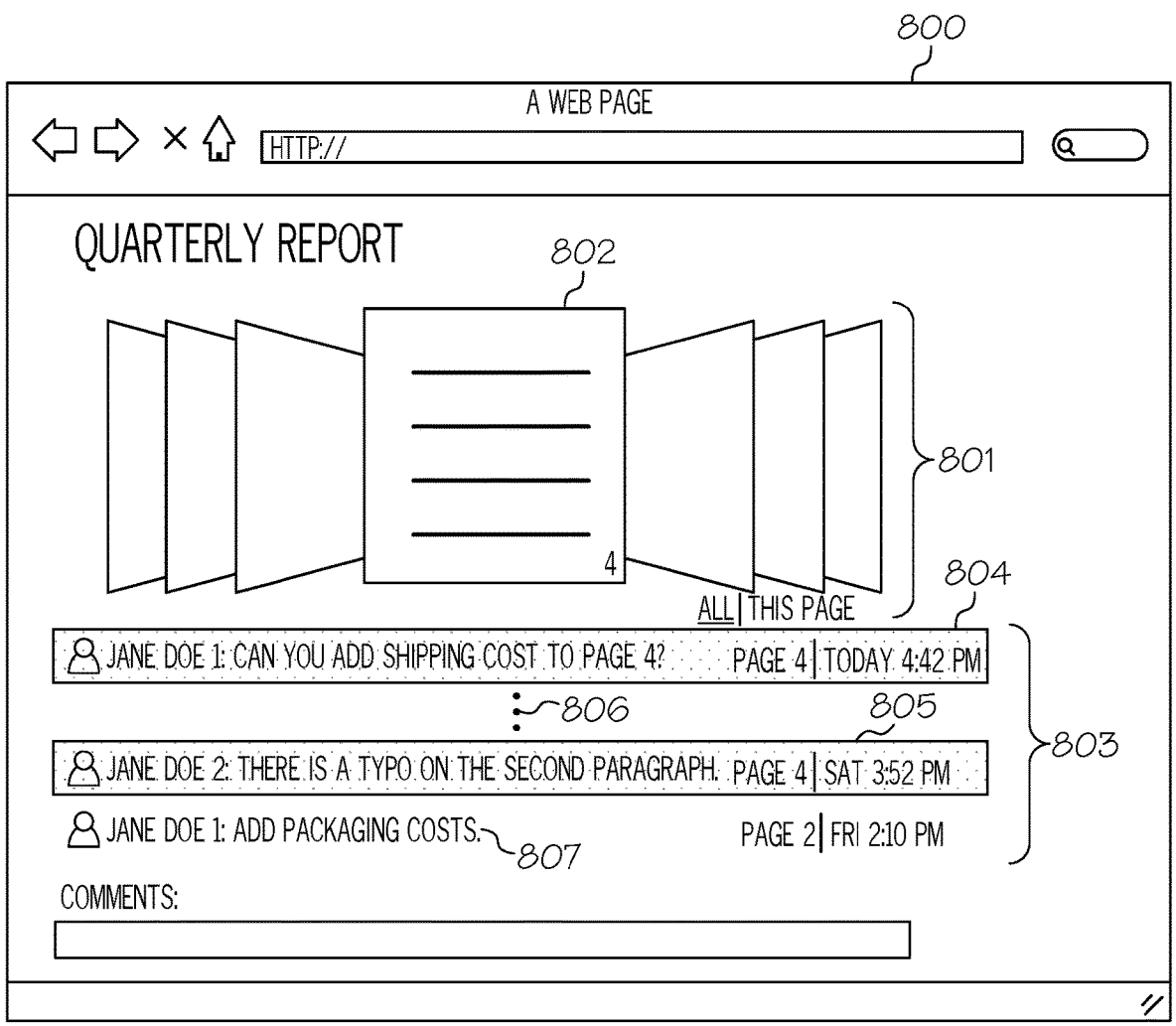
FIG. 8 illustrates a screenshot of a user interface on a client device displaying the elements of a container along with a comment section that includes comments to the elements of the container, where the use of an ellipsis is used to convey that many additional comments were made pertaining to the other elements of the container between the time of the first and second comment in accordance with an embodiment of the present invention.
Figure 9:
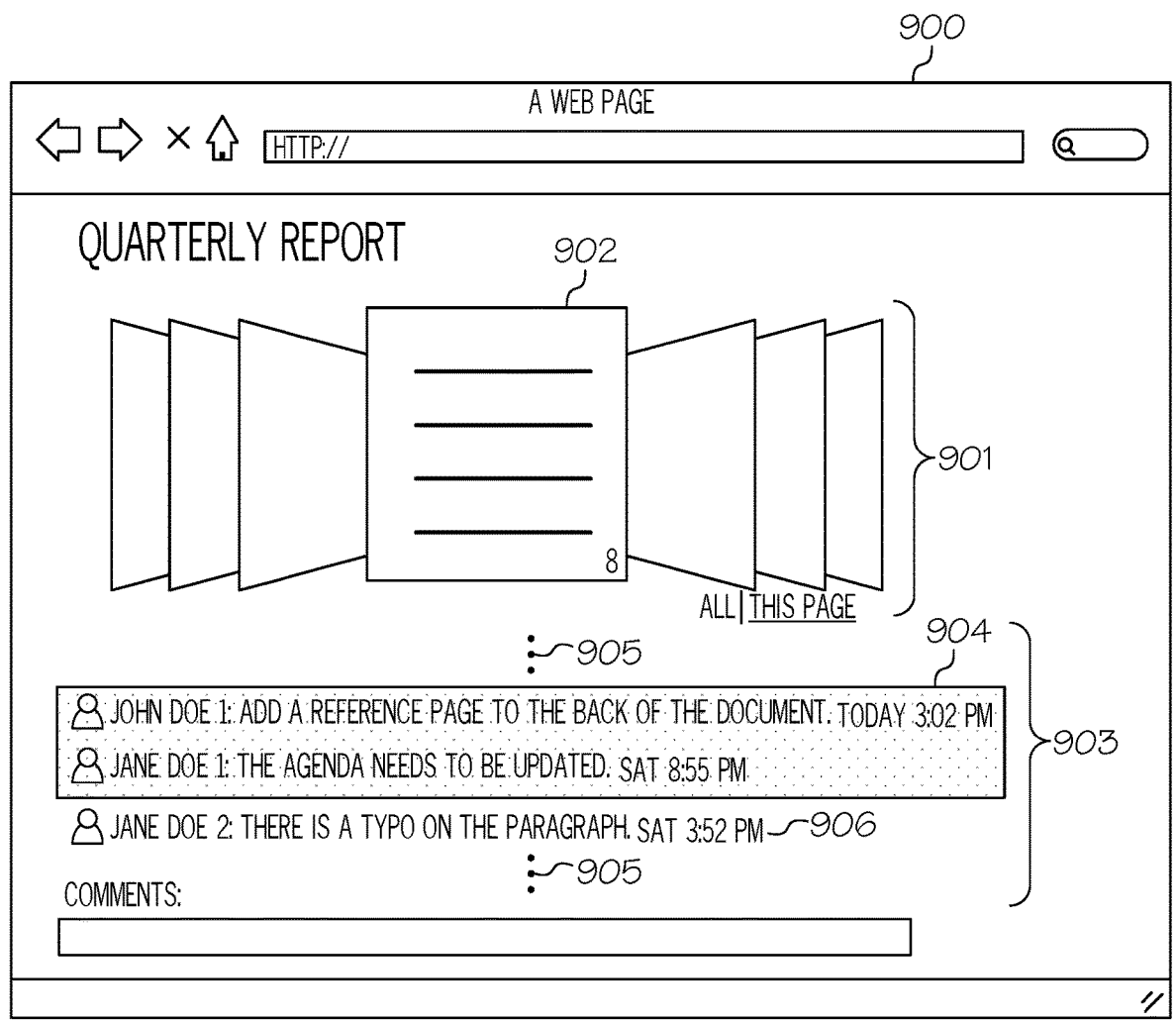
FIG. 9 illustrates a screenshot of a user interface on a client device displaying the elements of a container along with a comment section that includes comments to the elements of the container, where the use of an ellipsis is used to convey that many additional comments were made pertaining to the other elements of the container before and after the comments on the element depicted in the center section of the fliptych in accordance with an embodiment of the present invention.
Figure 10:
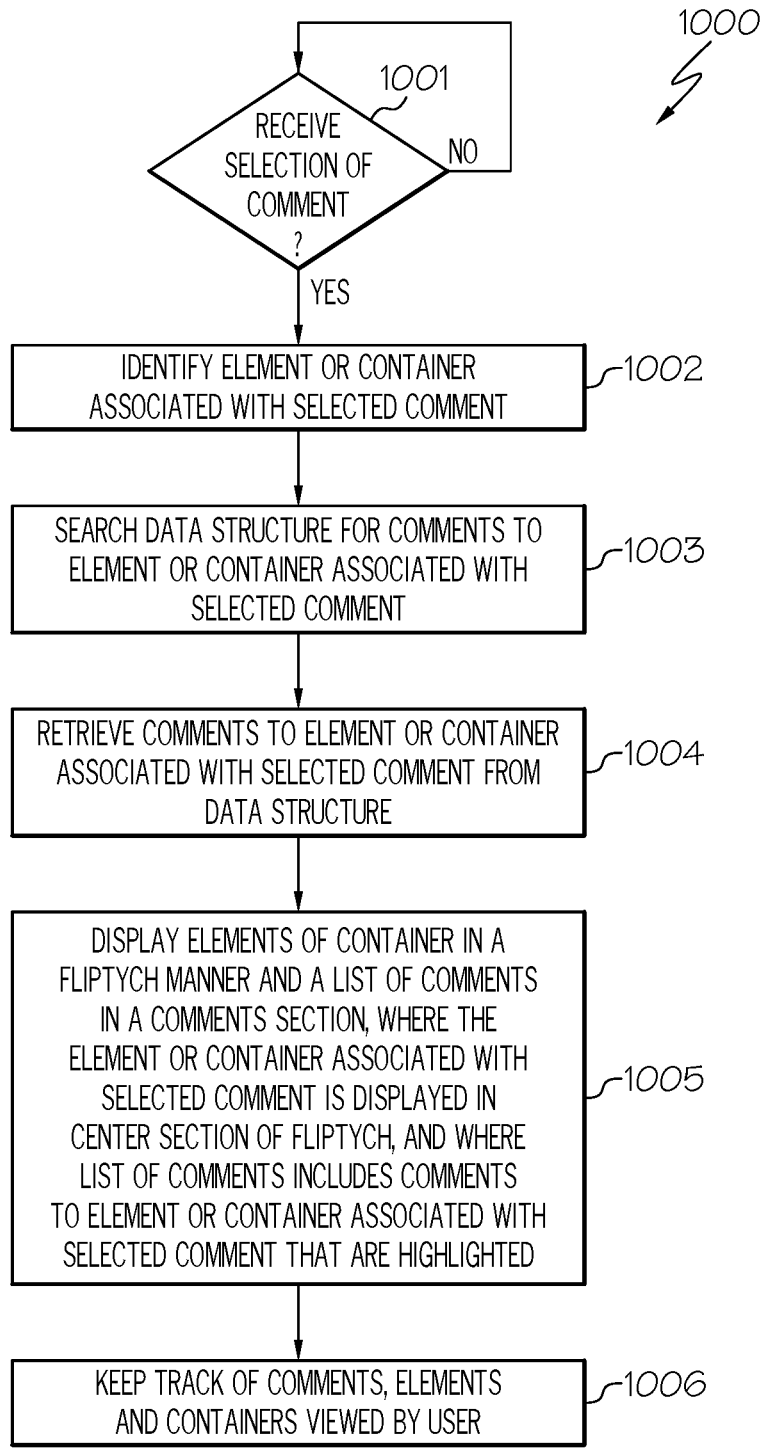
FIG. 10 is a flowchart of a method for navigating between elements of the container by clicking on comments in the comment section in accordance with an embodiment of the present invention.
Figure 11:
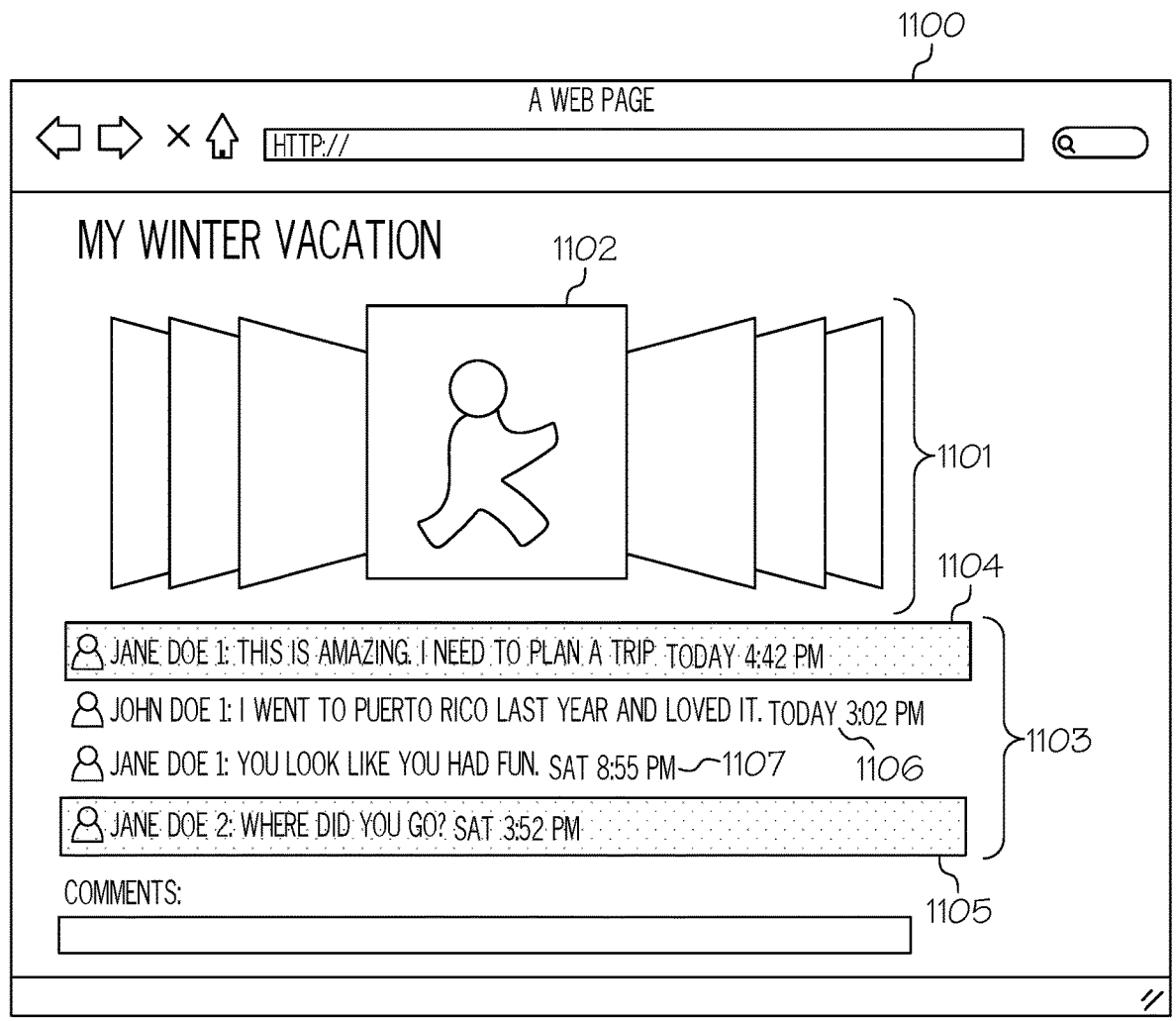
FIG. 11 illustrates a screenshot of a user interface on a client device in response to the user selecting a comment in the comment section, where a new element associated with the selected comment is depicted in the center section of the fliptych and where comments in the comment section directed to the element displayed in the center section are highlighted in accordance with an embodiment of the present invention.
Figure 12:
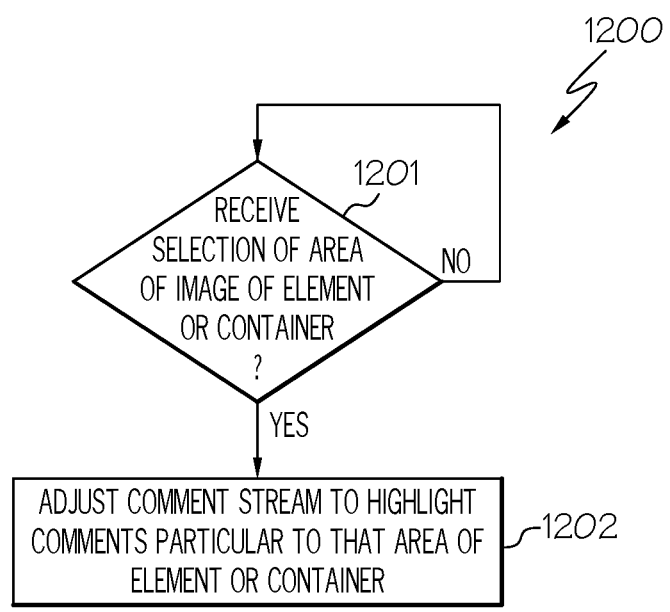
FIG. 12 is a flowchart of a method for adjusting the comment stream in response to the user selecting an area of an element or container in accordance with an embodiment of the present invention.

The principles of the present invention provide a means for improving the understanding of the relationship between the comments being made to the containers (e.g., photo album) and the comments being made to the elements of the containers (e.g., photographs) by displaying the elements of a container in a fliptych manner, where the user selects to receive comments pertaining to one of the elements of the container or the container itself and where the selected element or container is displayed in the center section of the fliptych. Furthermore, comments are displayed in a comment section below the fliptych, where the comments in the comment section that are directed to the element or container displayed in the center section of the fliptych are highlighted as discussed below in association with FIGS. 3, 4A-4C and 5-12. FIG. 3 is a flowchart of a method for monitoring and storing comments to the container (e.g., photo album) and the elements of the container (e.g., photographs). FIGS. 4A-4C are a flowchart of a method for displaying the elements of a container in a fliptych manner along with a comment section containing highlighted comments directed to the element or container depicted in the center section of the fliptych. FIG. 5 illustrates a screenshot of a user interface on a client device displaying the elements of a container in a fliptych manner along with a comment section, where the comments in the comment section directed to the element or container depicted in the center section of the fliptych are highlighted. FIG. 6 is a flowchart of a method for adjusting the comment stream in response to the user selecting an image of a different element in the fliptych to become the currently selected element. FIG. 7 illustrates a screenshot of a user interface on a client device displaying the elements of a container, such as pages of a document, in a fliptych manner along with a comment section that includes comments to the pages of the document, where the comments directed to the page depicted in the center section of the fliptych are highlighted. FIG. 8 illustrates a screenshot of a user interface on a client device displaying the elements of a container along with a comment section that includes comments to the elements of the container, where the use of an ellipsis is used to convey that many additional comments were made pertaining to the other elements of the container between the time of the first and second comment. FIG. 9 illustrates a screenshot of a user interface on a client device displaying the elements of a container along with a comment section that includes comments to the elements of the container, where the use of an ellipsis is used to convey that many additional comments were made pertaining to the other elements of the container before and after the comments on the element depicted in the center section of the fliptych. FIG. 10 is a flowchart of a method for navigating between elements of the container by clicking on comments in the comment section. FIG. 11 illustrates a screenshot of a user interface on a client device in response to the user selecting a comment in the comment section, where a new element associated with the selected comment is depicted in the center section of the fliptych and where comments in the comment section directed to the element displayed in the center section are highlighted. FIG. 12 is a flowchart of a method for adjusting the comment stream in response to the user selecting an area of an element or container.

As discussed above, FIG. 3 is a flowchart of a method 300 for monitoring and storing comments to the container (e.g., photo album) and the elements of the container (e.g., photographs) in accordance with an embodiment of the present invention.

Referring to FIG. 3, in conjunction with FIGS. 1-2, in step 301, comment notification system 104 monitors social media streams (e.g., social media streams for client devices 101) for comments to a container (e.g., photo album) and elements within the container (e.g., photographs). A "container," as used herein, refers to a digital collection of elements. For example, a container may be a photo album, a collection of documents, a document or a collection of files. An element of the container may be a photograph, a document, a page or section of a document, or a file. In one embodiment, "monitoring," as used herein, includes the aspect for monitoring notifications of comments being made, such as from commenting engine 106 in client device 101. Furthermore, "monitoring," as used herein, includes the aspect of intercepting a comment, such as when it is added or removed from the social media stream.

In step 302, a determination is made by comment notification system 104 as to whether comment notification system 104 identifies any comments to the container or element within the container. If comment notification system 104 does not identify any comments to the container or element within the container, then comment notification system 104 continues to monitor social media streams for comments to a container (e.g., photo album) and elements within the container (e.g., photographs) in step 301.

If, however, comment notification system 104 identifies comments to the container or elements within the container, then, in step 303, comment notification system 104 saves the comments to a data structure, such as an index or a table in a database 105, along with an identification (e.g., marker, such as a Uniform Resource Locator (URL)) of the container or element of the container upon which the comments are directed.

In step 304, comment notification system 104 notifies a user (e.g., user of client device 101A) regarding comments made to the container and/or element(s) of the container. For example, comment notification system 104 may deliver a notification to the user of client device 101 indicating that comments were made to the container (e.g., comments made to a photo album) and/or elements of the container (e.g., comments made to photos of photo album). For instance, the user may receive a notification regarding comments being made to photographs 3, 4, 5 of the photo album *My Winter Vacation*, where the underlined texts are links to the appropriate element or container. Upon selecting such links, the elements of the container are displayed in a fliptych manner along with a comment section with comments directed to the selected element or container as discussed in further detail below. In this manner, the principles of the present invention allow a single notification for all comments across multiple elements in a collection and the collection itself. For example, if the user clicked on the $3^{rd}$ photograph link in the notification, the user would see on the user interface of client device 101 a fliptych of all the photographs of the photo album My Winter Vacation with the selected photograph ($3^{rd}$ photograph) displayed in the center section of the fliptych and the comments in the comment section directed to the $3^{rd}$ photograph being highlighted as discussed further below.

In one embodiment, comment notification system 104 keeps a node graph of updates, where each node in the graph represents an element of a container or a container and each of these nodes include further nodes representing comments to the respective element or container. Comment notification system 104 marks elements or comments in the graph when viewed by each user, effectively keeping a per user graph of the updates viewed by each user. Comment notification system 104 can then query the graph for elements or comments which have not been viewed by a certain user, and notify about nodes which include nested elements or comments not viewed by the user.

After notifying the user regarding comments made to the container and/or element(s) of the container as discussed above, the user may select to view the comments pertaining to the container or element(s) of the container. The elements of the container will then be displayed to the user interface of client device 101 in a fliptych manner along with a comment section containing highlighted comments that are directed to the element or container depicted in the center section of the fliptych corresponding to the element or container for which the user selected to view comments as discussed below in connection with FIGS. 4A-4C.

FIGS. 4A-4C are a flowchart of a method 400 for displaying the elements of a container in a fliptych manner along with a comment section containing highlighted comments directed to the element or container depicted in the center section of the fliptych in accordance with an embodiment of the present invention.

Referring to FIG. 4A, in conjunction with FIGS. 1-3, in step 401, a determination is made by comment notification system 104 as to whether it received a selection from the user to view comments of an element within the container or the container itself in the notification the user received in step 304 of FIG. 3. For example, if the user (e.g., user of client device 101) received a notification regarding a comment being made to photographs 3, 4, 5 of the photo album *My Winter Vacation*, and the user selected to view the comments to photograph 3 of the photo album, then the user selected to view comments of the element (e.g., photograph 3) of the container (e.g., My Winter Vacation photo album) in the notification.

If comment notification system 104 did not receive a selection from the user to view comments of an element within the container or the container itself in the notification the user received in step 304 of FIG. 3, then, in step 401, comment notification system 104 continues to determine whether it received a selection from the user to view comments of an element within the container or the container itself in the notification the user received.

If, however, comment notification system 104 received a selection from the user to view comments of an element within the container or the container itself in the notification, then, in step 402, comment notification system 104 searches the data structure for comments to the selected element or container. As discussed above, the comments are stored in the data structure along with an identification of the element or container to which the comments apply. Hence, comment notification system 104 is able to retrieve the appropriate comments based on using the identification of the element or container for which the user selected to view comments.

In step 403, comment notification system 104 retrieves the comments to the selected element or container from the data structure.

In step 404, a determination is made by comment notification system 104 regarding whether there is insufficient area on the display of the user's computing device (i.e., client device 101) to display comments to the selected element or container.

If there is insufficient area on the display of the user's computing device (i.e., client device 101) to display comments to the selected element or container, then, in step 405, comment notification system 104 prioritizes the comments retrieved from the data structure based on the author of the comments on the element or container for which the user selected to view comments and comments temporally and sequentially close to the comments on the element or container for which the user selected to view comments. In this manner, the comments listed in the comments section (discussed in further detail below) will correspond to the highest rated comments. For example, if the display of the user's computing device only has space to display five comments in the comments section, then the five highest rated comments will be displayed in the comments section.

In step 406, comment notification system 104 displays images of the elements of the container in a fliptych manner and a list of comments in a comments section (discussed in further detail below), where an image of the selected element or container is displayed in the center section of the fliptych, and where the list of comments includes prioritized comments to the selected element or container which are highlighted. A "fliptych," as used herein, refers to displaying each item in a collection or container as an image in a horizontal stack. The stack is composed in three sections, previous list items, the current list item and upcoming list items. Images representing previous list items occupy the left-hand portion of the stack are skewed accordingly and fall into shadow. The image representing the selected element or container occupies the center section and receives full illumination and remains unskewed. Images representing upcoming list items occupy the right-hand portion of the stack and are skewed accordingly and also fall into shadow. A more detailed description of a fliptych is provided further below.

In step 407, comment notification system 104 keeps track of the comments, elements and containers viewed by the user, such as via a node graph as discussed above.

Returning to step 404, if, however, there is sufficient area on the display of the user's computing device (i.e., client device 101) to display comments to the selected element or container, then, in step 408, a determination is made by comment notification system 104 as to whether there is available space on the display of the user's computing device (i.e., client device 101) to display related comments.

Referring to FIG. 4B, if there is available space on the display of the user's computing device (i.e., client device 101) to display related comments, then, in step 409, a determination is made by comment notification system 104 as to whether there are any comments that the user has not yet seen. In one embodiment, comment notification system 104 provides a high priority to comments not previously seen by the user to be displayed along with the comments directed to the element or container selected by the user.

If there are comments that the user has not yet seen, then, in step 410, comment notification system 104 searches the data structure for comments related to the comments of the selected element or container using natural language processing. For example, if the comments to the selected element or container were directed to a trip to Puerto Rico, then comments related to the trip may be identified based on using keywords, such as "Puerto Rico" or "trip."

In step 411, comment notification system 104 retrieves the comments related to the comments of the selected element or container from the data structure.

In step 412, comment notification system 104 displays elements of the container in a fliptych manner and a list of comments in a comments section, where an image of the selected element or container is displayed in the center section of the fliptych, and where the list of comments includes comments to the selected element or container which are highlighted as well as comments related to the comments of the selected element or container as illustrated in FIG. 5. In this manner, as discussed further below, an album view is provided which makes it unnecessary to have separate comments on the album itself. All comments are made on a very particular element, but the user still gets an album experience and view of the comments. Hence, the user is able to obtain a better understanding of the relationship between the comments being made to the containers (e.g., photo album) and the comments being made to the elements of the containers (e.g., photographs).

In step 413, comment notification system 104 keeps track of the comments, elements and containers viewed by the user, such as via a node graph as discussed above.

FIG. 5 illustrates a screenshot of a user interface 500 on a client device 101 (FIG. 1) displaying the elements of a container in a fliptych manner along with a comment section, where the comments in the comment section directed to the element or container depicted in the center section of the fliptych are highlighted in accordance with an embodiment of the present invention.

Referring to FIG. 5, in conjunction with FIGS. 1-3 and 4A-4C, user interface 500 displays the elements (e.g., photographs) of a container (e.g., photo album entitled "My Winter Vacation") in a fliptych manner 501. As discussed above, fliptych 501 displays each element of the container as an image in a horizontal stack. The image 502 representing the selected element or container occupies the center section and receives full illumination and remains unskewed. In contrast, images representing previous list elements occupy the left-hand portion of the stack are skewed accordingly and fall into shadow and images representing upcoming list items occupy the right-hand portion of the stack and are skewed accordingly and also fall into shadow.

User interface 500 further displays a comment section 503 including comments 504 directed to the element or container displayed in the center section of fliptych 501 (i.e., the element or container for which the user selected to view comments). In one embodiment, such comments 504 are highlighted to distinguish between other comments that are displayed in the list of comments 503 but were not directly posted in connection with the element or container displayed in the center section of fliptych 501. As discussed above, these other comments may include comments related to the comments directed to the element or container displayed in the center section of fliptych 501. For example, referring to FIG. 5, comments 504 are directed to the trip to Puerto Rico; whereas, the other comments 505, 506 in the list of comments 503 were deemed to be related to these comments since they are directed to planning a trip (comment 505) or a familiar question that is asked in response to telling a person that you were on vacation (comment 506).

In one embodiment, comments are sent to client device 101 in a serialized form according to criteria discussed herein, where the serialized form indicates which of the comments are applicable to the currently selected element.

As the user flips through fliptych 501, a different element (e.g., photograph) becomes the currently selected element and the comment view adjusts automatically to highlight comments on the current element as discussed below in connection with FIG. 6. It is noted that the album view of the comments is preserved.

FIG. 6 is a flowchart of a method 600 for adjusting the comment stream in response to the user selecting an image of a different element in fliptych 501 (FIG. 5) to become the currently selected element in accordance with an embodiment of the present invention.

Referring to FIG. 6, in conjunction with FIGS. 1-3, 4A-4C and 5, in step 601, a determination is made by comment notification system 104 as to whether the user selected one of the images of the elements in either the left-hand or right-hand portion of the stack.

If the user did not select one of the images of the elements in either the left-hand or right-hand portion of the stack, then comment notification system 104 continues to determine whether the user selected one of the images of the elements in either the left-hand or right-hand portion of the stack in step 601.

If, however, the user selected one of the images of the elements in either the left-hand or right-hand portion of the stack, then comment notification system 104 displays the selected image in the center section 502 of fliptych 501.

In step 603, comment notification system 104 search the data structure for comments to the selected element as discussed above in connection with step 402 of FIG. 4A.

In step 604, comment notification system 104 retrieves the comments to the selected element from the data structure.

In step 605, comment notification system 104 adjusts the comment stream 503 to include comments 504 directed to the selected element which are highlighted.

Furthermore, in a "collection" view where an image of the container (e.g., document) is displayed as the center section of the fliptych, when the user selects a different element (e.g., page of the document) to become the currently selected element, the user may "drill down" from the album or collection view of all documents into the view of a particular document (e.g., page 4 of the document), such as shown in FIG. 7 (discussed further below). The comment stream adjusts as discussed above in connection with FIG. 6. While the complete set of comments across all pages in all the elements/documents is displayed in the "collection" view, when drilling down, the comment stream adjusts to only show comments from the currently viewed document with the highlighted comments being directed to the current page (page displayed in the center section of the fliptych) instead of the document.

Returning to step 409 of FIG. 4B, if there no comments that the user has not yet seen, then, in step 414, comment notification system 104 selects additional comments from the data structure based on the author of the comments on the element or container for which the user selected to view comments and comments temporally and sequentially close to the comments on the element or container for which the user selected to view comments.

In step 415, comment notification system 104 displays the images of the elements of the container in a fliptych manner and a list of comments in a comments section, where the image of the selected element or container is displayed in center section 502 of fliptych 501, and where the list of comments 503 include comments 504 to the selected element or container which are highlighted as well as the selected additional comments as illustrated in FIG. 7.

In step 416, comment notification system 104 keeps track of the comments, elements and containers viewed by the user, such as via a node graph as discussed above.

FIG. 7 illustrates a screenshot of a user interface 700 on a client device 101 (FIG. 1) displaying the elements of a container, such as pages of a document, in a fliptych manner along with a comment section that includes comments to the pages of the document, where the comments directed to the page depicted in the center section of the fliptych are highlighted in accordance with an embodiment of the present invention.

Referring to FIG. 7, in conjunction with FIGS. 1-3, 4A-4C and 5-6, user interface 700 displays the elements (e.g., pages) of a container (e.g., report entitled "Quarterly Report") in a fliptych manner 701.

User interface 700 further displays a comment section 703 including comments 704 directed to the element (e.g., page 4 of the Quarterly Report) displayed in the center section 702 of fliptych 701 (i.e., the element for which the user selected to view comments). In one embodiment, such comments 704 are highlighted to distinguish between other comments that are displayed in the list of comments 703 but were not directly posted in connection with the element or container displayed in the center section of fliptych 701. As discussed above, these other comments may be additional comments that were obtained from the data structure based on the author of the comments on the element for which the user selected to view comments and comments temporally and sequentially close to the comments on the element for which the user selected to view comments. For example, referring to FIG. 7, comment 705 posted by Jane Doe 1 was included in the list of comments 703 since Jane Doe 1 was an author of a comment directed to the element (e.g., page 4 of the Quarterly Report) displayed in the center section 702 of fliptych 701. In another example, comment 706 posted by John Doe 1 was included in the list of comments 703 since it was temporally and sequentially close to the comments posted in connection with the element (e.g., page 4 of the Quarterly Report) displayed in the center section 702 of fliptych 701.

In one embodiment, an ellipsis may be used to convey that many additional comments were made in connection with other elements (e.g., pages) of the container (e.g., document) between the comments directed to the element displayed in the center section of the fliptych as illustrated in FIG. 8.

FIG. 8 illustrates a screenshot of a user interface 800 on a client device 101 (FIG. 1) displaying the elements of a container along with a comment section that includes comments to the elements of the container, where the use of an ellipsis is used to convey that many additional comments were made pertaining to the other elements of the container between the time of the first and second comment in accordance with an embodiment of the present invention.

Referring to FIG. 8, in conjunction with FIGS. 1-3, 4A-4C and 5-7, user interface 800 displays the elements (e.g., pages) of a container (e.g., report entitled "Quarterly Report") in a fliptych manner 801.

User interface 800 further displays a comment section 803 including comments 804 directed to the element (e.g., page 4 of the Quarterly Report) displayed in the center section 802 of fliptych 801 (i.e., the element for which the user selected to view comments). In one embodiment, such comments 804, 805 are highlighted to distinguish between other comments that are displayed in the list of comments 803 but were not directly posted in connection with the element or container displayed in the center section of fliptych 801. As illustrated in FIG. 8, an ellipsis 806 is used to convey that many additional comments were made on other pages between the time of the first and second comment 804, 805, respectively. As also illustrated in FIG. 8, an additional comment 807 from Jane Doe 1 is shown since Jane Doe 1 made a comment on this page and since this particular comment, "to add packaging costs," while made on another page, is semantically similar to the content of this page ("add the shipping costs") which is uncommon in this collection of pages (document). Including additional comment 807 in the list of comments 803 is an example of utilizing natural language processing as discussed above in connection with step 410 of FIG. 4B and being an author of a comment directed to the element displayed in the center section 802 of fliptych 801 as discussed above in connection with steps 414-415 of FIG. 4B and FIG. 7.

FIG. 9 illustrates a screenshot of a user interface 900 on a client device 101 (FIG. 1) displaying the elements of a container along with a comment section that includes comments to the elements of the container, where the use of an ellipsis is used to convey that many additional comments were made pertaining to the other elements of the container before and after the comments on the element depicted in the center section of the fliptych in accordance with an embodiment of the present invention.

Referring to FIG. 9, in conjunction with FIGS. 1-3, 4A-4C and 5-8, user interface 900 displays the elements (e.g., pages) of a container (e.g., report entitled "Quarterly Report") in a fliptych manner 901.

User interface 900 further displays a comment section 903 including comments 904 directed to the element (e.g., page 4 of the Quarterly Report) displayed in the center section 902 of fliptych 901 (i.e., the element for which the user selected to view comments). In one embodiment, such comments 904 are highlighted to distinguish between other comments that are displayed in the list of comments 903 but were not directly posted in connection with the element or container displayed in the center section of fliptych 901. As illustrated in FIG. 9, an ellipsis 905 is used to convey that many additional comments were made pertaining to the other elements of the container before and after the comments on the element depicted in the center section 902 of fliptych 901. FIG. 9 further illustrates an additional comment 906 made by Jane Doe 2 which is displayed since it is was relatively close temporally to the comments on the element displayed in the center section 902 of fliptych 901 and no other related comments were found. Including additional comment 906 in the list of comments 903 is an example of selecting comments that temporally close to the comments on the element displayed in the center section 902 of fliptych 901 as discussed above in connection with steps 414-415 of FIG. 4B and FIG. 7.

Returning to step 408 of FIG. 4A, if there is not available space on the display of the user's computing device (i.e., client device 101) to display related comments, then, referring to FIG. 4C, in conjunction with FIGS. 1-3 and 5-9, in step 417, comment notification system 104 displays the elements of the container in a fliptych manner and a list of comments in the comments section, where the selected element or container is displayed in the center section of the fliptych and where the list of comments only includes comments to the selected element or container which are highlighted as discussed previously herein.

In step 418, comment notification system 104 keeps track of the comments, elements and containers viewed by the user, such as via a node graph as discussed above.

As discussed above, comment notification system 104 displays the elements of the container in a fliptych manner and a list of comments in the comments section. The user may navigate between elements of the container by clicking on comments as discussed below in connection with FIGS. 10 and 11.

FIG. 10 is a flowchart of a method 1000 for navigating between elements of the container by clicking on comments in the comment section in accordance with an embodiment of the present invention.

Referring to FIG. 10, in conjunction with FIGS. 1-3, 4A-4C and 5-9, in step 1001, a determination is made by comment navigation system 104 as to whether it received a selection of a comment in the comment section (e.g., comment section 503, comment section 703, comment section 803, comment section 903) from the user.

If comment navigation system 104 did not receive a selection of a comment in a comment section from the user, then comment navigation system 104 continues to determine whether it received a selection of a comment in the comment section in step 1001.

If, however, comment navigation system 104 received a selection of a comment in the comment section, then, in step 1002, comment navigation system 104 identifies the element or container associated with the selected comment.

In step 1003, comment navigation system 104 searches the data structure for comments to the element or container associated with the selected comment.

In step 1004, comment navigation system 104 retrieves the comments to the element or container associated with the selected comment from the data structure.

In step 1005, comment navigation system 104 displays the elements of the container in a fliptych manner and a list of comments in the comments section, where the element or container associated with the selected comment is displayed in the center section of the fliptych, and where the list of comments includes comments to the element or container associated with the selected comment that are highlighted as illustrated in FIG. 11.

In step 1006, comment notification system 104 keeps track of the comments, elements and containers viewed by the user, such as via a node graph as discussed above.

FIG. 11 illustrates a screenshot of a user interface 1100 on a client device 101 (FIG. 1) in response to the user selecting a comment in the comment section, where a new element associated with the selected comment is depicted in the center section of the fliptych and where comments in the comment section directed to the element displayed in the center section are highlighted in accordance with an embodiment of the present invention.

Referring to FIG. 11, in conjunction with FIG. 5, as previously discussed, user interface 500 of FIG. 5 displays a comment section 503 including comments 504 directed to the element or container displayed in the center section of fliptych 501 (i.e., the element or container for which the user selected to view comments). In one embodiment, such comments 504 are highlighted to distinguish between other comments that are displayed in the list of comments 503 but were not directly posted in connection with the element or container displayed in the center section of fliptych 501. As discussed above, these other comments may include comments related to the comments directed to the element or container displayed in the center section of fliptych 501. For example, referring to FIG. 5, comments 504 are directed to the trip to Puerto Rico; whereas, the other comments 505, 506 in the list of comments 503 were deemed to be related to these comments since they are directed to planning a trip (comment 505) or a familiar question that is asked in response to telling a person that you were on vacation (comment 506). If the user selected, such as by clicking with a mouse, comment 506, then user interface 500 would be updated as shown in FIG. 11.

FIG. 11 illustrates the updated user interface 500 represented by user interface 1100 which displays the elements (e.g., photographs) of a container (e.g., photo album entitled "My Winter Vacation") in a fliptych manner 1101.

User interface 1100 further displays an updated comment section 1103 including comments 1104, 1105 directed to the element (displayed in the center section 1102 of fliptych 1101 which corresponds to the element related to the comment (comment 506) selected by the user. In one embodiment, such comments 1104, 1105 are highlighted to distinguish between other comments 1106, 1107 that are displayed in the list of comments 1103 but were not directly posted in connection with the element displayed in the center section of fliptych 1101. As shown in FIG. 11, the comment (comment 506) selected by the user now becomes comment 1105 which is highlighted to indicate that it is a comment directed to the element displayed in the center section of fliptych 1101.

In addition to adjusting the comment stream in response to selecting a new element in the fliptych or selecting a comment in the comment section, the comment stream may be adjusted in response to the user selecting an area of the element or container as discussed below in connection with FIG. 12.

FIG. 12 is a flowchart of a method 1200 for adjusting the comment stream in response to the user selecting an area of an element or container in accordance with an embodiment of the present invention.

Referring to FIG. 12, in conjunction with FIGS. 1-3, 4A-4C and 5-11, in step 1201, a determination is made by comment notification system 104 as to whether it received a selection of an area of an image of an element or container displayed in the fliptych.

If comment notification system 104 did not receive a selection of an area of an image of an element or container displayed in the fliptych, then comment notification system 104 continues to determine whether it received a selection of an area of an image of an element or container displayed in the fliptych in step 1201.

If, however, comment notification system 104 received a selection of an area of an image of an element or container displayed in the fliptych, then, in step 1202, comment notification system 104 adjusts the comment stream to highlight comments particular to that area of the element or container, such as by highlighting those comments in the comment section directed to that area of the element or container.

It is noted that the principles of the present invention may be applied to any arbitrary level of hierarchy, including greater than two levels, such as with a deep folder structure.

Furthermore, the principles of the present invention apply to tag clouds and collections dynamically created as a result of a search. The elements in the fliptych may be controlled by a tag cloud or search terms. In addition to drilling down through the elements of the fliptych itself, the user may also be drilling down through supplemental navigation tools, such as a tag cloud or by clicking on hashtags in the comments or the elements (documents) themselves, or in supplemental facets. As the user drills down, dynamically creating a new collection, the fliptych and the comment stream adjust, showing only comments from elements in the new collection and selecting only those related to the currently highlighted element.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for improving understanding of comments on collections of data, the computer program product comprising a computer readable storage medium having program code embodied therewith, the program code comprising the programming instructions for:
monitoring a social media stream for comments to a container and elements within said container;
issuing a notification on a user interface of a user's computing device regarding one or more of the following: comments made to said container and one or more elements of said container in response to identifying said comments to one or more of the following: said container and said one or more elements of said container, wherein said notification comprises one or more links to one or more of the following: said container and said one or more elements of said container; and
displaying images of elements of said container in a fliptych manner and a first list of comments in a comments section on said user interface of said user's computing device in response to a user selecting one or more of said one or more links to one or more of the following: said container and said one or more elements of said container, wherein an image of said container or an element of said container selected by said user is displayed in a center section of said fliptych, wherein said first list of comments comprises comments directed to said container or said element of said container selected by said user which are highlighted.

2. The computer program product as recited in claim 1, wherein the program code further comprises the programming instructions for:
keeping a node graph of updates, wherein each node in said graph of updates represents an element of a container or a container and each of these nodes includes further nodes representing comments to the respective element or container.

3. The computer program product as recited in claim 1, wherein the program code further comprises the programming instructions for:
saving said comments to one or more of the following: said container and said one or more elements of said container to a data structure in response to identifying said comments to one or more of the following: said container and said one or more elements of said container.

4. The computer program product as recited in claim 3, wherein the program code further comprises the programming instructions for:
searching said data structure for comments related to said comments directed to said container or said element of said container selected by said user in response to having available space on a display of said user's computing device to display related comments; and
retrieving said comments related to said comments directed to said container or said element of said container selected by said user from said data structure; wherein said first list of comments comprises said retrieved comments related to said comments directed to said container or said element of said container selected by said user.

5. The computer program product as recited in claim 3, wherein the program code further comprises the programming instructions for:
retrieving said comments directed to said container or said element of said container selected by said user from said data structure; and
prioritizing comments retrieved from said data structure based on an author of comments to said container or said element of said container selected by said user and based on comments temporally and sequentially close to comments to said container or said element of said container selected by said user in response to an insufficient area on a display of said user's computing device to display all of said comments retrieved from said data structure, wherein said first list of comments comprises a number of said prioritized comments to said container or said element of said container selected by said user equal to a number of comments that can be displayed in said comments section.

6. The computer program product as recited in claim 3, wherein the program code further comprises the programming instructions for:
retrieving said comments directed to said container or said element of said container selected by said user from said data structure; and
selecting additional comments from said data structure based on an author of comments to said container or said element of said container selected by said user as and based on comments temporally and sequentially close to comments to said container or said element of said container selected by said user in response to having available space on a display of said user's computing device to display related comments and in response to there being no comments said user has not seen, wherein said first list of comments comprises said additional comments.

7. The computer program product as recited in claim 3, wherein the program code further comprises the programming instructions for:
displaying an image of a second element of said container in said center section of said fliptych in response to said user selecting said second element previously displayed in either a left-hand portion or a right-hand portion of a stack of said fliptych;
searching said data structure for comments to said second element;
retrieving said comments to said second element from said data structure; and
displaying a second list of comments to replace said first list of comments, wherein said second list of comments comprises said comments to said second element which are highlighted.

8. The computer program product as recited in claim 1, wherein the program code further comprises the programming instructions for:
displaying images of said elements of said container in said fliptych manner and a second list of comments in said comments section in response to said user selecting a comment in said first list of comments directed to a second element of said container, wherein an image of said second element is displayed in said center section of said fliptych, wherein said second list of comments comprises comments directed to said second element of said container.

9. The computer program product as recited in claim 1, wherein the program code further comprises the programming instructions for:
receiving a selection of an area of said image of said container or said element of said container selected by said user displayed in said fliptych; and
adjusting comments displayed in said first list of comments to highlight comments particular to said selected area of said image of said container or said element of said container selected by said user displayed in said fliptych.

10. The computer program product as recited in claim 1, wherein said container comprises one of the following: a photo album, a collection of documents, a document, and a collection of files, wherein said element of said container comprises one of the following: a photograph, a document, a page or section of a document, and a file.

11. A system, comprising:
a memory for storing a computer program for improving understanding of comments on collections of data; and
a processor connected to said memory, wherein said processor is configured to execute the program instructions of the computer program comprising:
monitoring a social media stream for comments to a container and elements within said container;
issuing a notification on a user interface of a user's computing device regarding one or more of the following: comments made to said container and one or more elements of said container in response to identifying said comments to one or more of the following: said container and said one or more elements of said container, wherein said notification comprises one or more links to one or more of the following: said container and said one or more elements of said container; and
displaying images of elements of said container in a fliptych manner and a first list of comments in a comments section on said user interface of said user's computing device in response to a user selecting one or more of said one or more links to one or more of the following: said container and said one or more elements of said container, wherein an image of said container or an element of said container selected by said user is displayed in a center section of said fliptych, wherein said first list of comments comprises comments directed to said container or said element of said container selected by said user which are highlighted.

12. The system as recited in claim 11, wherein the program instructions of the computer program further comprise:
keeping a node graph of updates, wherein each node in said graph of updates represents an element of a container or a container and each of these nodes includes further nodes representing comments to the respective element or container.

13. The system as recited in claim 11, wherein the program instructions of the computer program further comprise:
saving said comments to one or more of the following: said container and said one or more elements of said container to a data structure in response to identifying said comments to one or more of the following: said container and said one or more elements of said container.

14. The system as recited in claim 13, wherein the program instructions of the computer program further comprise:
searching said data structure for comments related to said comments directed to said container or said element of said container selected by said user in response to having available space on a display of said user's computing device to display related comments; and
retrieving said comments related to said comments directed to said container or said element of said container selected by said user from said data structure; wherein said first list of comments comprises said retrieved comments related to said comments directed to said container or said element of said container selected by said user.

15. The system as recited in claim 13, wherein the program instructions of the computer program further comprise:
retrieving said comments directed to said container or said element of said container selected by said user from said data structure; and
prioritizing comments retrieved from said data structure based on an author of comments to said container or said element of said container selected by said user and based on comments temporally and sequentially close to comments to said container or said element of said container selected by said user in response to an insufficient area on a display of said user's computing device to display all of said comments retrieved from said data structure, wherein said first list of comments comprises a number of said prioritized comments to said container or said element of said container selected by said user equal to a number of comments that can be displayed in said comments section.

16. The system as recited in claim 13, wherein the program instructions of the computer program further comprise:
retrieving said comments directed to said container or said element of said container selected by said user from said data structure; and
selecting additional comments from said data structure based on an author of comments to said container or said element of said container selected by said user as and based on comments temporally and sequentially close to comments to said container or said element of said container selected by said user in response to having available space on a display of said user's computing device to display related comments and in response to there being no comments said user has not seen, wherein said first list of comments comprises said additional comments.

17. The system as recited in claim 13, wherein the program instructions of the computer program further comprise:
displaying an image of a second element of said container in said center section of said fliptych in response to said user selecting said second element previously displayed in either a left-hand portion or a right-hand portion of a stack of said fliptych;
searching said data structure for comments to said second element;
retrieving said comments to said second element from said data structure; and
displaying a second list of comments to replace said first list of comments, wherein said second list of comments comprises said comments to said second element which are highlighted.

18. The system as recited in claim 11, wherein the program instructions of the computer program further comprise:
displaying images of said elements of said container in said fliptych manner and a second list of comments in said comments section in response to said user selecting a comment in said first list of comments directed to a second element of said container, wherein an image of said second element is displayed in said center section of said fliptych, wherein said second list of comments comprises comments directed to said second element of said container.

19. The system as recited in claim 11, wherein the program instructions of the computer program further comprise:
receiving a selection of an area of said image of said container or said element of said container selected by said user displayed in said fliptych; and
adjusting comments displayed in said first list of comments to highlight comments particular to said selected area of said image of said container or said element of said container selected by said user displayed in said fliptych.

20. The system as recited in claim 11, wherein said container comprises one of the following: a photo album, a collection of documents, a document, and a collection of files, wherein said element of said container comprises one of the following: a photograph, a document, a page or section of a document, and a file.

* * * * *